United States Patent
Shameli et al.

(10) Patent No.: US 7,595,732 B2
(45) Date of Patent: Sep. 29, 2009

(54) POWER GENERATING CIRCUIT

(75) Inventors: Amin Shameli, Irvine, CA (US); Ahmadreza (Reza) Rofougaran, Newport Coast, CA (US); Franco De Flaviis, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 92 days.

(21) Appl. No.: 11/394,808

(22) Filed: Mar. 31, 2006

(65) Prior Publication Data

US 2007/0236851 A1    Oct. 11, 2007

(51) Int. Cl.
*G05F 3/16* (2006.01)
*H04B 5/00* (2006.01)
*G08B 13/14* (2006.01)

(52) U.S. Cl. ............... 340/572.5; 340/572.7; 340/10.4; 323/223; 323/225; 343/860; 343/861; 455/41.1

(58) Field of Classification Search ............ 340/10.1, 340/10.4, 572.1, 572.5, 572.7; 235/492; 455/41.1, 41.2; 343/850, 860, 861; 323/223, 323/225
See application file for complete search history.

(56) References Cited

U.S. PATENT DOCUMENTS

| | | | | |
|---|---|---|---|---|
| 6,079,622 A * | 6/2000 | Goto | ............... | 235/492 |
| 6,140,924 A * | 10/2000 | Chia et al. | ............... | 340/572.5 |
| 6,172,608 B1 * | 1/2001 | Cole | ............... | 340/572.1 |
| 6,427,065 B1 * | 7/2002 | Suga et al. | ............... | 455/41.1 |
| 6,549,064 B2 * | 4/2003 | Bandy et al. | ............... | 327/536 |
| 6,570,490 B1 * | 5/2003 | Saitoh et al. | ............... | 340/10.1 |
| 6,621,467 B1 * | 9/2003 | Marsh | ............... | 343/850 |
| 6,942,156 B2 * | 9/2005 | Ohta et al. | ............... | 235/492 |
| 7,167,090 B1 * | 1/2007 | Mandal et al. | ............... | 340/538.14 |

* cited by examiner

*Primary Examiner*—Davetta W Goins
*Assistant Examiner*—Anne V Lai
(74) *Attorney, Agent, or Firm*—Garlick Harrison & Markison; Timothy W. Markison

(57) ABSTRACT

A power generating circuit includes a rectifying module and a tuning module. The rectifying module is operably coupled to convert a radio frequency (RF) signal into a voltage. The tuning module is operably coupled to tune the rectifying module in accordance with the RF signal.

17 Claims, 7 Drawing Sheets

POWER GENERATING CIRCUIT

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to generating power from radio frequency signals.

2. Description of Related Art

A radio frequency identification (RFID) system generally includes a reader, also known as an interrogator, and a remote tag, also known as a transponder. Each tag stores identification data for use in identifying a person, article, parcel or other object. RFID systems may use active tags that include an internal power source, such as a battery, and/or passive tags that do not contain an internal power source, but generate power from radio frequency (RF) signals received from a reader.

In general, to access the identification data stored on an RFID tag, the RFID reader generates a modulated RF interrogation signal designed to evoke a modulated RF response from a tag. The RF response from the tag includes the coded identification data stored in the RFID tag. The RFID reader decodes the coded identification data to identify the person, article, parcel or other object associated with the RFID tag. For passive tags, the RFID reader may also generate an unmodulated, continuous wave (CW) signal from which the passive tag derives its power.

RFID systems typically employ either far-field technology, in which the distance between the reader and the tag is great compared to the wavelength of the carrier signal, or near-field technology, in which the operating distance is less than one wavelength of the carrier signal. In far-field applications, the RFID reader generates and transmits an RF signal via an antenna to all tags within range of the antenna. One or more of the tags that receive the RF signal responds to the reader using a backscattering technique in which the tags modulate and reflect the received RF signal. In near-field applications, the RFID reader and tag communicate via mutual inductance between corresponding reader and tag inductors.

In RFID systems that include passive tags and employ far-field technology, a passive tag's ability to generate power from a received RF signal directly correlates to the overall efficiency and effectiveness of an RFID system. In addition, such RFID tag power generation circuits need to be small and inexpensive. One such power generation circuit is a passive rectifier cell. As is known, a passive rectifier cell includes a plurality of diodes and capacitors where, in effect, the diodes steer energy of the RF signals into the capacitors to build up a voltage. The stored voltage is then used to power the tag. While a passive rectifier cell meets the design requirements fairly well, there is loss due to the threshold voltage of the diodes and capacitor leakage. In addition, the passive rectifier cell is not a voltage doubling circuit, thus, increasing the voltage after about three cell stages is limited.

Another known power generating circuit is a charge pump that includes a plurality of cells, where each cell includes two transistors and two capacitors. Each cell operates to build a charge in one capacitor through a corresponding transistor when the phase of the RF signal is between 0 and $\pi$ and builds another charge in the other capacitor through its corresponding transistor when the phase of the RF signal is between $\pi$ and $2\pi$. The charges of the capacitors are summed to produce a cell voltage. The cells are cascoded to cumulate the cell voltages to produce the resulting output voltage.

While the charge pump power generating circuit enables a convenient CMOS implementation, its impedance limits the frequencies at which the circuit may be used and creates an impedance mismatch with most antenna structures. As such, for many RFID applications, a charge pump power generating circuit fails to provide an efficient power recovery unit.

Therefore, a need exists for a highly integrated, low-cost power generating circuit for a wide variety of RFID applications.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
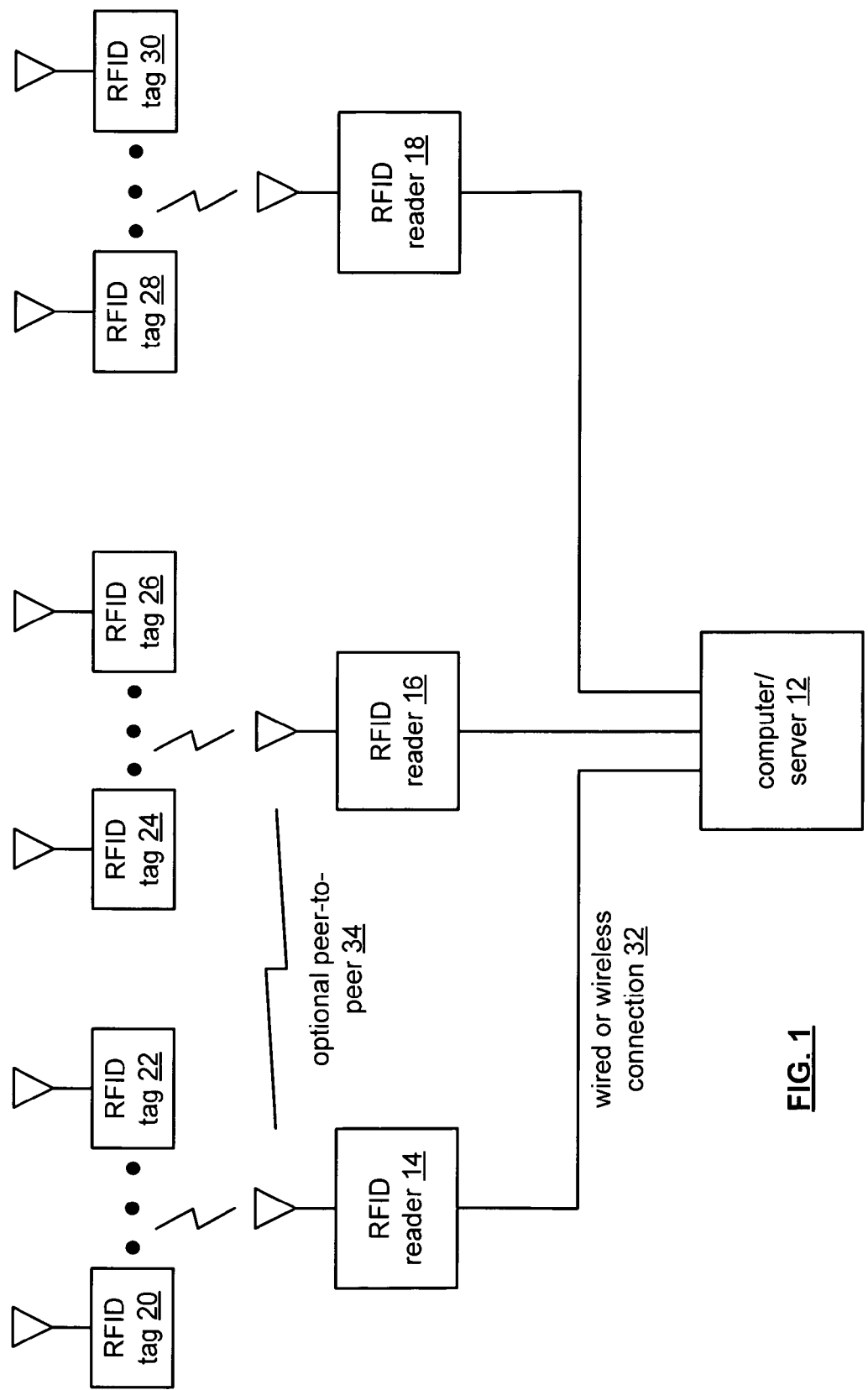
FIG. 1 is a schematic block diagram of an RFID system in accordance with the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, tracking inventory, tracking status, location determination, assembly progress, et cetera.

Each RFID reader 14-18 wirelessly communicates with one or more RFID tags 20-30 within its coverage area. For example, RFID reader 14 may have RFID tags 20 and 22 within its coverage area, while RFID reader 16 has RFID tags 24 and 26, and RFID reader 18 has RFID tags 28 and 30 within its coverage area. The RF communication scheme between the RFID readers 14-18 and RFID tags 20-30 may be a back scatter technique whereby the RFID readers 14-18 provide energy to the RFID tags via an RF signal. The RFID tags derive power from the RF signal and respond on the same RF carrier frequency with the requested data.

In this manner, the RFID readers 14-18 collect data as may be requested from the computer/server 12 from each of the RFID tags 20-30 within its coverage area. The collected data is then conveyed to computer/server 12 via the wired or wireless connection 32 and/or via the peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag would store the data in a non-volatile memory.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 computer/server 12. Communications between RFID reader 16 and computer/server 12 are conveyed through RFID reader 14 and the wired or wireless connection 32, which may be any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 1 may be expanded to include a multitude of RFID readers 14-18 distributed throughout a desired location (for example, a building, office site, et cetera) where the RFID tags may be associated with equipment, inventory, personnel, et cetera. Note that the computer/server 12 may be coupled to another server and/or network connection to provide wide area network coverage. Further note that the carrier frequency of the wireless communication between the RFID readers 14-18 and RFID tags 20-30 may range from about 10 MHz to several gigahertz.

Figure 2:
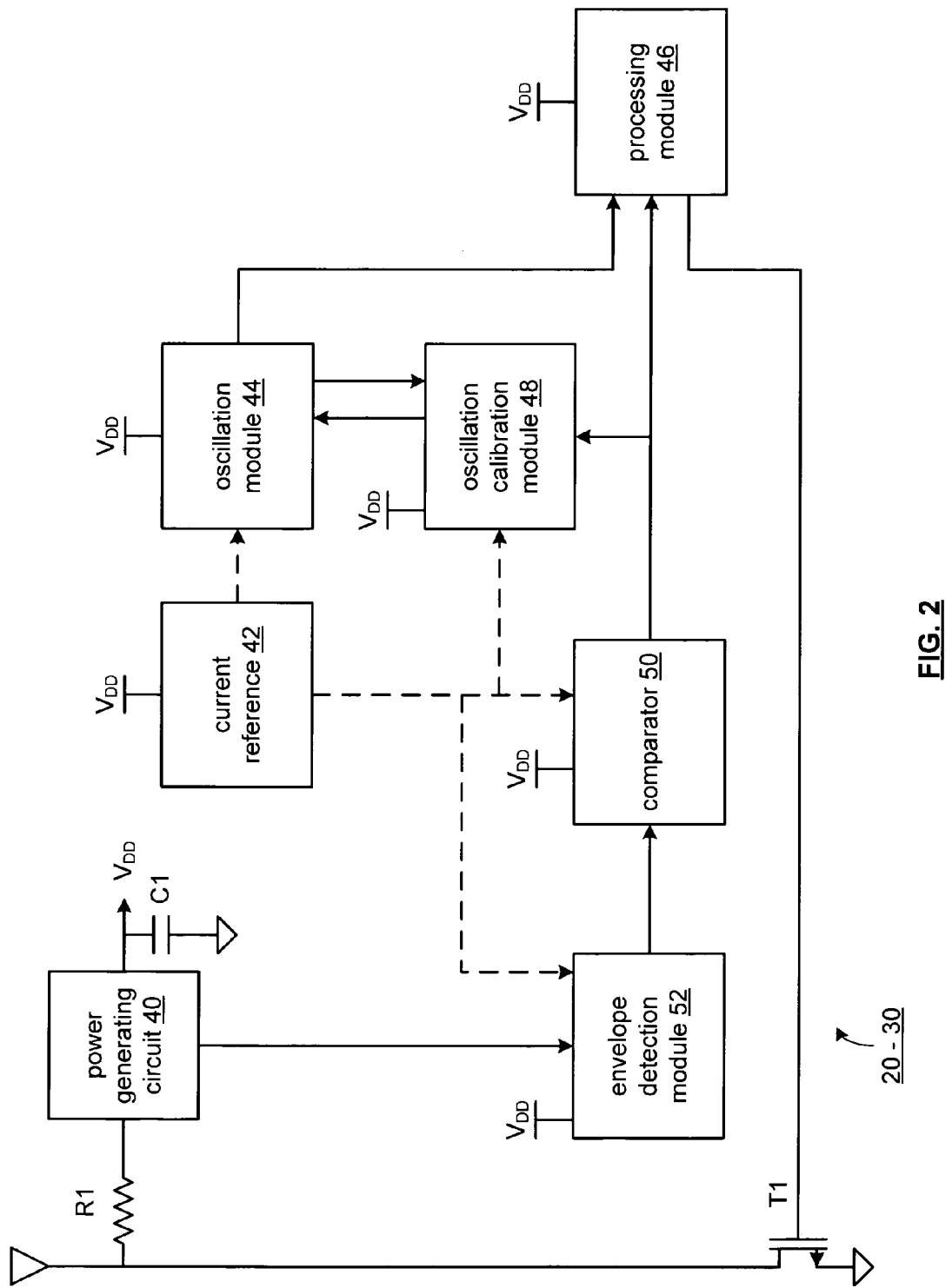
FIG. 2 is a schematic block diagram of an RFID tag in accordance with the present invention.

FIG. 2 is a schematic block diagram of an RFID tag 20-30 that includes a power generating circuit 40, a current reference 42, an oscillation module 44, a processing module 46, an oscillation calibration module 48, a comparator 50, an envelope detection module 52, an optional resistor R1, a capacitor C1, and a transistor T1. The current reference 42, the oscillation module 44, the processing module 46, the oscillation calibration module 48, the comparator 50, and the envelope detection module 52 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. One or more of the modules 42-52 may have an associated memory element, which may be a single memory device, a plurality of memory devices, and/or embedded circuitry of the module. Such a memory device may be a read-only memory, random access memory, volatile memory, non-volatile memory, static memory, dynamic memory, flash memory, cache memory, and/or any device that stores digital information. Note that when the module 42-52 implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the module 42-52 executes, hard coded and/or operational instructions corresponding to at least some of the steps and/or functions illustrated in FIG. 2.

In operation, the power generating circuit 40, which will be described in greater detail with reference to FIGS. 3-7, generates a supply voltage ($V_{DD}$) from a radio frequency (RF) signal that is received via an antenna and, if included, resistor R1. The power generating circuit 40 stores the supply voltage $V_{DD}$ in capacitor C1 and provides it to modules 42-52.

When the supply voltage $V_{DD}$ is present, the envelope detection module 52 determines an envelope of the RF signal, which includes a DC component corresponding to the supply voltage $V_{DD}$. In one embodiment, the RF signal is an amplitude modulation signal, where the envelope of the RF signal includes transmitted data. The envelope detection module 52 provides an envelope signal to the comparator 50. The comparator 50 compares the envelope signal with a threshold to produce a stream of recovered data.

The oscillation module 44, which may be a ring oscillator, crystal oscillator, or timing circuit, generates one or more clock signals that have a rate corresponding to the rate of the RF signal in accordance with an oscillation feedback signal. For instance, if the RF signal is a 900 MHz signal, the rate of the clock signals will be n*900 MHz, where "n" is equal to or greater than 1.

The oscillation calibration module 48 produces the oscillation feedback signal from a clock signal of the one or more clock signals and the stream of recovered data. In general, the oscillation calibration module 48 compares the rate of the clock signal with the rate of the stream of recovered data. Based on this comparison, the oscillation calibration module 48 generates the oscillation feedback to indicate to the oscillation module 44 to maintain the current rate, speed up the current rate, or slow down the current rate.

The processing module 46 receives the stream of recovered data and a clock signal of the one or more clock signals. The processing module 46 interprets the stream of recovered data to determine a command or commands contained therein. The command may be to store data, update data, reply with stored data, verify command compliance, acknowledgement, etc. If the command(s) requires a response, the processing module 46 provides a signal to the transistor T1 at a rate corresponding to the RF signal. The signal toggles transistor T1 on and off to generate an RF response signal that is transmitted via the antenna. In one embodiment, the RFID tag 20-30 utilizing a back-scattering RF communication. Note that the resistor R1 functions to decouple the power generating circuit 40 from the received RF signals and the transmitted RF signals.

The RFID tag 20-30 may further include the current reference 42 that provides one or more reference, or bias, currents to the oscillation module 44, the oscillation calibration module 48, the envelope detection module 52, and the comparator 50. The bias current may be adjusted to provide a desired level of biasing for each of the modules 44, 48, 50, and 52.

Figure 3:
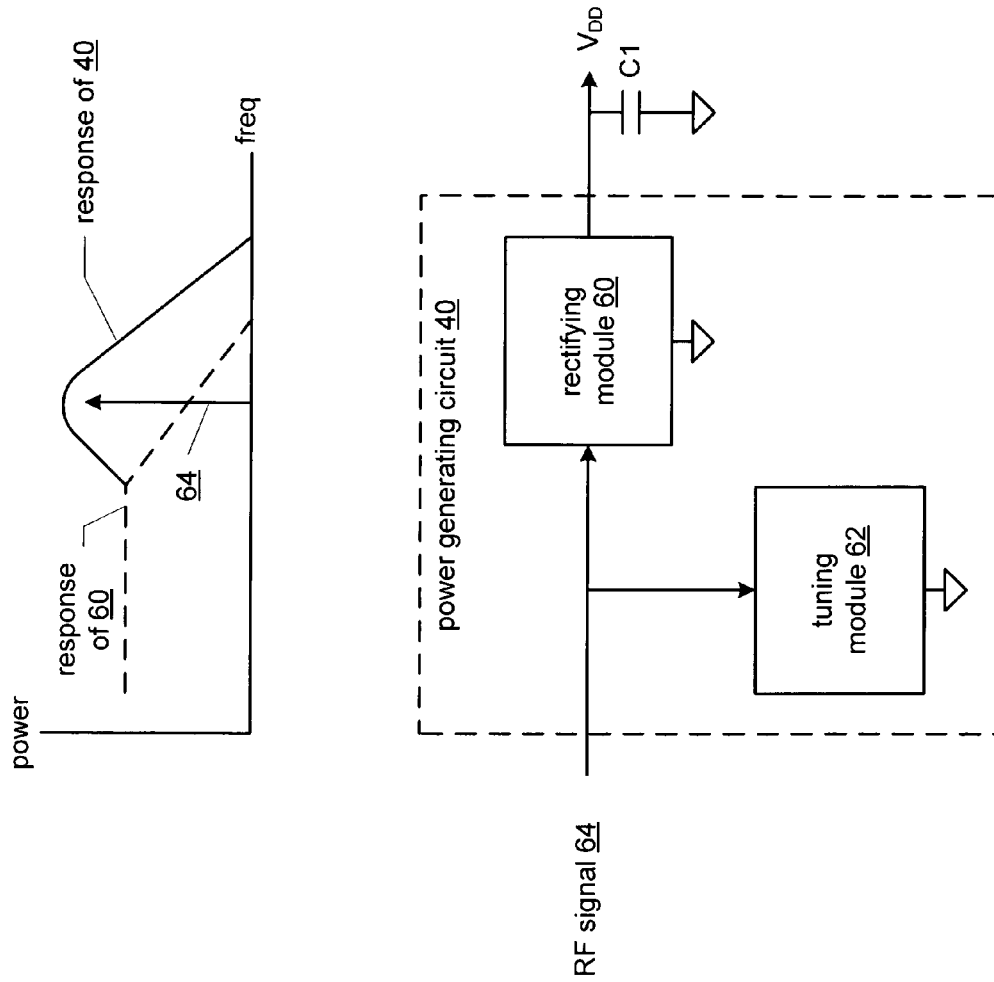
FIG. 3 is a schematic block diagram of an embodiment of a power generating circuit in accordance with the present invention.

FIG. 3 is a schematic block diagram of an embodiment of a power generating circuit 40 that includes a rectifying module 60, which may be an active cell rectifier or a charge pump rectifier, and a tuning module 62. The tuning module 62 is operably coupled to tune the rectifying module 60 in accordance with the RF signal 64. In other words, the tuning module 62 tunes the frequency response of the rectifying module 60 based on the frequency of the RF signal such that the frequency response of the power generating circuit 40 is optimized for the RF signal.

FIG. 3 further illustrates a frequency domain graph of the response of the rectifying module 60, the RF signal 64, and the overall response of the power generating circuit 40. As shown, a generalized frequency response of the rectifying module 60 may less than an optimal level at the frequency of the RF signal 64. When this is the case and without the tuning module 62, the power generating circuit's 40 ability to generate a supply voltage from the RF signal is limited due to the attenuation of the RF signal by the rectifying module 60.

The tuning module 62 tunes the rectifying module such that the frequency response of the power generating circuit 40 is optimized at the frequency of the RF signal 64. With the frequency response optimized, the RF signal is not attenuated (and may even be amplified) by the rectifying module 60 and, thus, the power generating circuit's ability to generate the supply voltage from the RF signal is also optimized.

Figure 4:
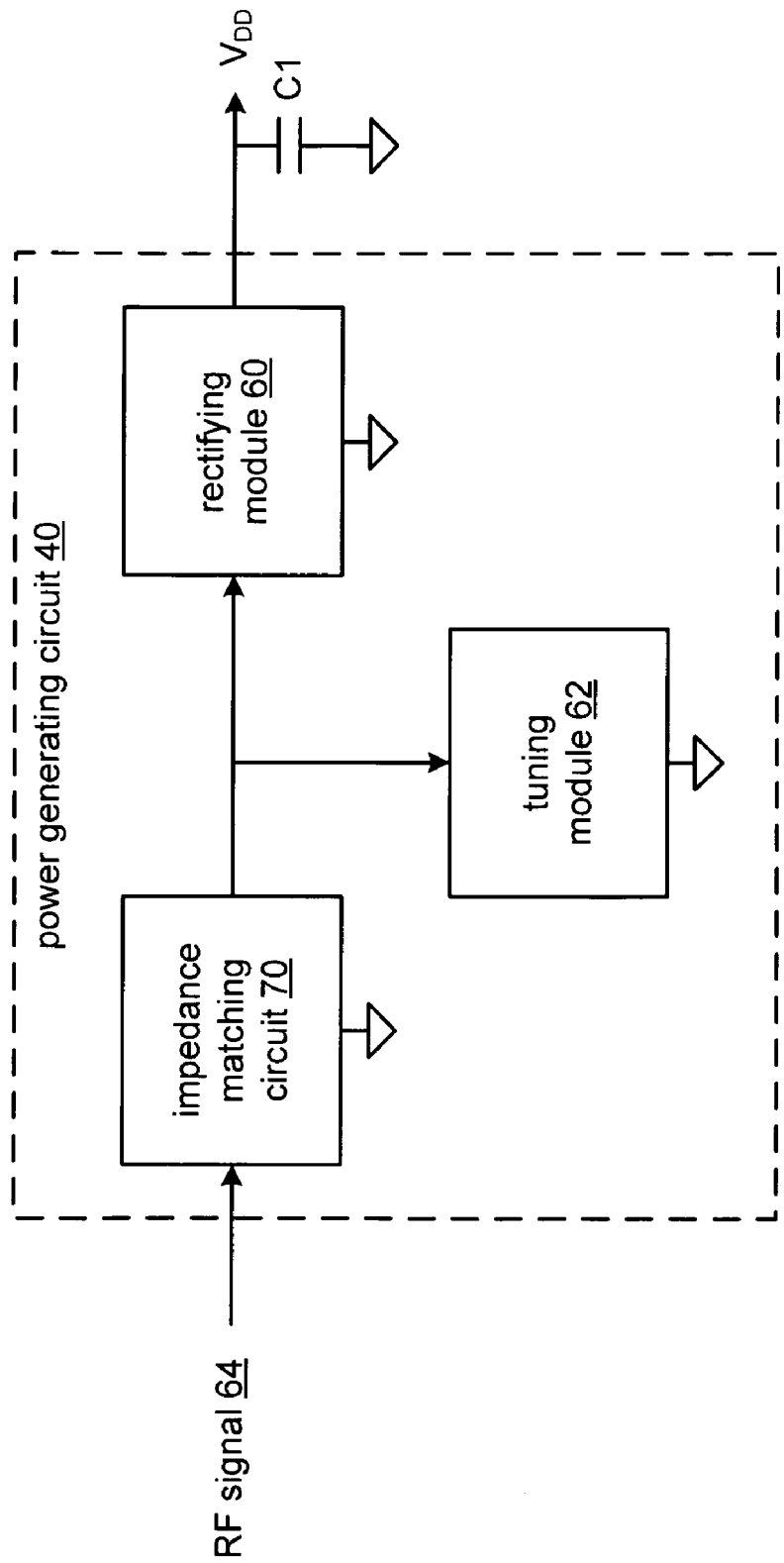
FIG. 4 is a schematic block diagram of another embodiment of a power generating circuit in accordance with the present invention.

FIG. 4 is a schematic block diagram of another embodiment of a power generating circuit 40 that includes the rectifying module 60, the tuning module 62, and an impedance matching circuit 70. In this embodiment, the rectifying module 60 and tuning module 62 function as previously described with reference to FIG. 3, however, the impedance of the power generating circuit 40 may not be at a desired value (e.g., 50 Ohms to substantially match the impendence of the antenna). The impedance matching circuit 70 adjusts the impedance of the power generating circuit 40 to provide a desired impedance in a frequency range encompassing the RF signal 64.

In an alternate embodiment, the power generating circuit 40 includes an adjust module and a conversion module. The adjust module, which may include the tuning module 62 and/or the impedance matching circuit 70, adjusts the RF signal. The conversion module, which may include the rectifying module 60, converts the adjusted RF signal into a voltage.

Figure 5:
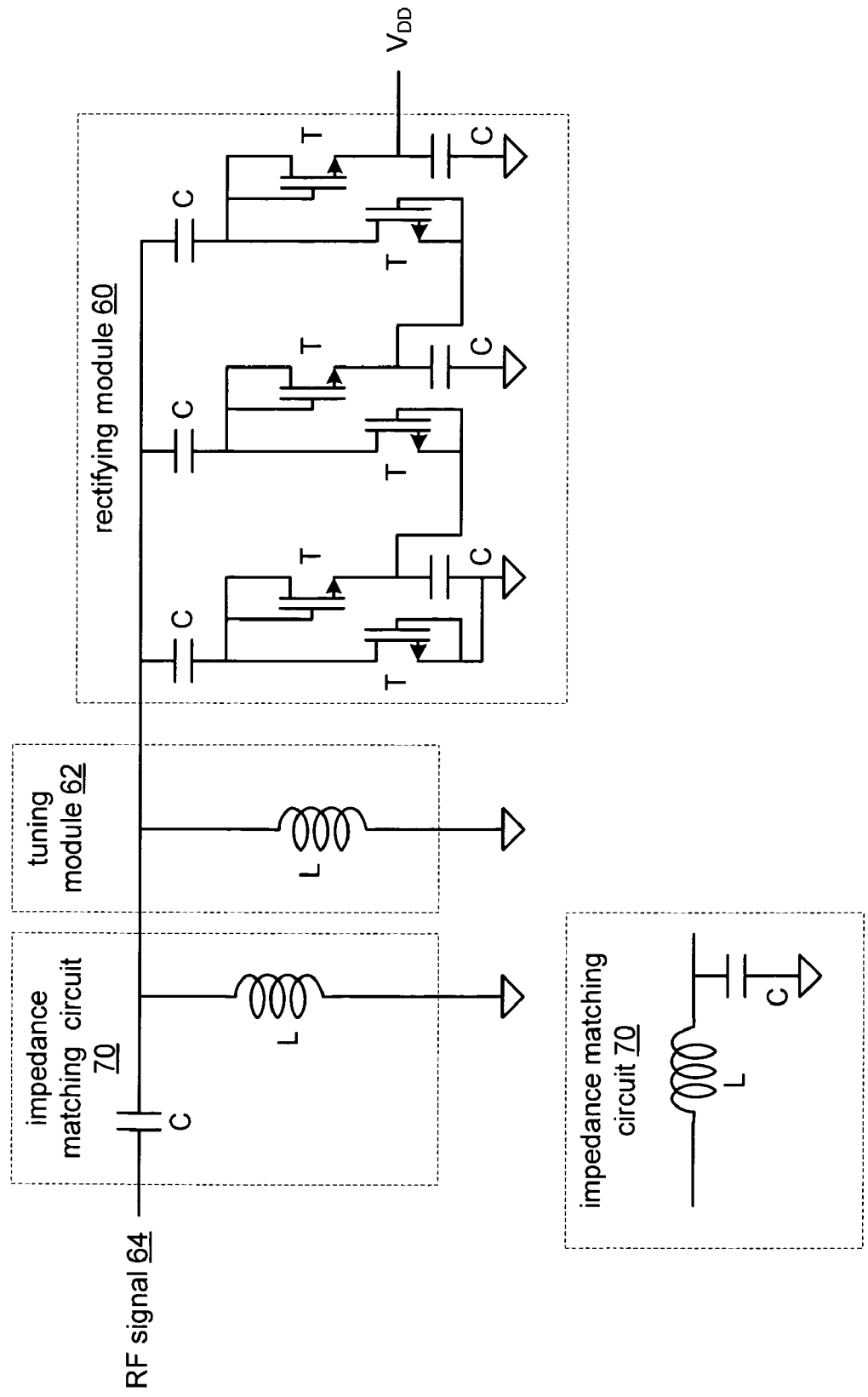
FIG. 5 is a schematic block diagram of yet another embodiment of a power generating circuit in accordance with the present invention.

FIG. 5 is a schematic block diagram of yet another embodiment of a power generating circuit 40 that includes the impedance matching circuit 70, the tuning module 62 (e.g., a parallel inductor, a series inductor with the inductor of impedance matching circuit 70, or a series capacitor), and the rectifying module 60. The impedance matching circuit 70 may be implemented as a capacitor-inductor filter or an inductor-capacitor filter. In either embodiment, the impedance matching circuit 70 has a resonant frequency based on the desired impedance. For instance, the rectifying module 60 may be modeled as an effective capacitor in parallel with an effective resistance. With this model and the known frequency of the RF signal (e.g., 900 MHz to 6 GHz), the resonant frequency of the impedance matching circuit 70 and the desired frequency response of the power generating circuit 40 (i.e., the value of the tuning module 62) may be readily determined. Note that an input impedance other than 50 Ohms may be used such that maximum power is obtained from the antenna. Further note that an optimum input impedance as seen from the antenna side may be achieved by taking into account both the reflection loss and voltage amplitude at the rectifier input port.

When the impedance matching circuit 70 includes a capacitor-inductor filter and the tuning module 62 include a parallel inductor, a single inductor may be used to provide the inductance for the tuning module 62 and the inductance of the impedance matching circuit 70. For instance, the inductor may be a high quality factor (e.g., 10 or greater) and have an impedance of a few nano-Henries. With this inductor, the capacitance can be chosen to have a self resonance frequency above or below the frequency of the RF signal. Note that the components of impedance matching circuit 70 and tuning circuit 62 may be adjustable. For example, an adjustable capacitor may be achieved by a plurality of capacitors switched using pre-charge transistors. Further note that the inductor may be used as the antenna to receive the RF signal. Use of the inductor as the antenna depends on the size of the inductor and the distance between the RFID reader and the RFID tag.

In this embodiment, the rectifying module 60 is shown as a charge pump rectifier having a plurality of transistors (T) and a plurality of capacitors (C), where two capacitors and two transistors form a cell. The cells are coupled to sequential increase the voltage on the capacitor of a cell that is coupled to ground. The supply voltage is provided by the ground coupled capacitor of the last cell. As one of ordinary skill in the art will appreciate, the number of cells in the rectifying module 60 may be more or less than the three shown. As one of ordinary skill in the art will further appreciate, the rectifying module 60 may employ an active cell rectifier topology.

In one embodiment, the transistors T may be native transistors such that the voltage drop to start to build a supply voltage is reduced. The following tables provide examples of the minimum value of the input voltage to overcome the voltage drop at different power levels.

| Minimum Voltage required in the input of the Rectifier to get Vo = 1 V and I = 2 uA with Wn = 2 um | | | | | | |
|---|---|---|---|---|---|---|
| | N (stages) | | | | | |
| | 2 | 3 | 4 | 5 | 6 | 7 |
| Typical Model, T = 25 | 0.45 | 0.36 | 0.31 | 0.29 | 0.26 | 0.25 |
| Slow Model, T = −25 | 0.55 | 0.46 | 0.43 | 0.4 | 0.38 | 0.37 |

| Minimum Voltage required in the input of the Rectifier to get Vo = 1 V and I = 2 uA with Wn = 3 um | | | | | | |
|---|---|---|---|---|---|---|
| | N (stages) | | | | | |
| | 2 | 3 | 4 | 5 | 6 | 7 |
| Typical Model, T = 25 | 0.45 | 0.35 | 0.3 | 0.28 | 0.25 | 0.23 |
| Slow Model, T = −25 | 0.55 | 0.46 | 0.42 | 0.39 | 0.37 | 0.35 |

Figure 6:
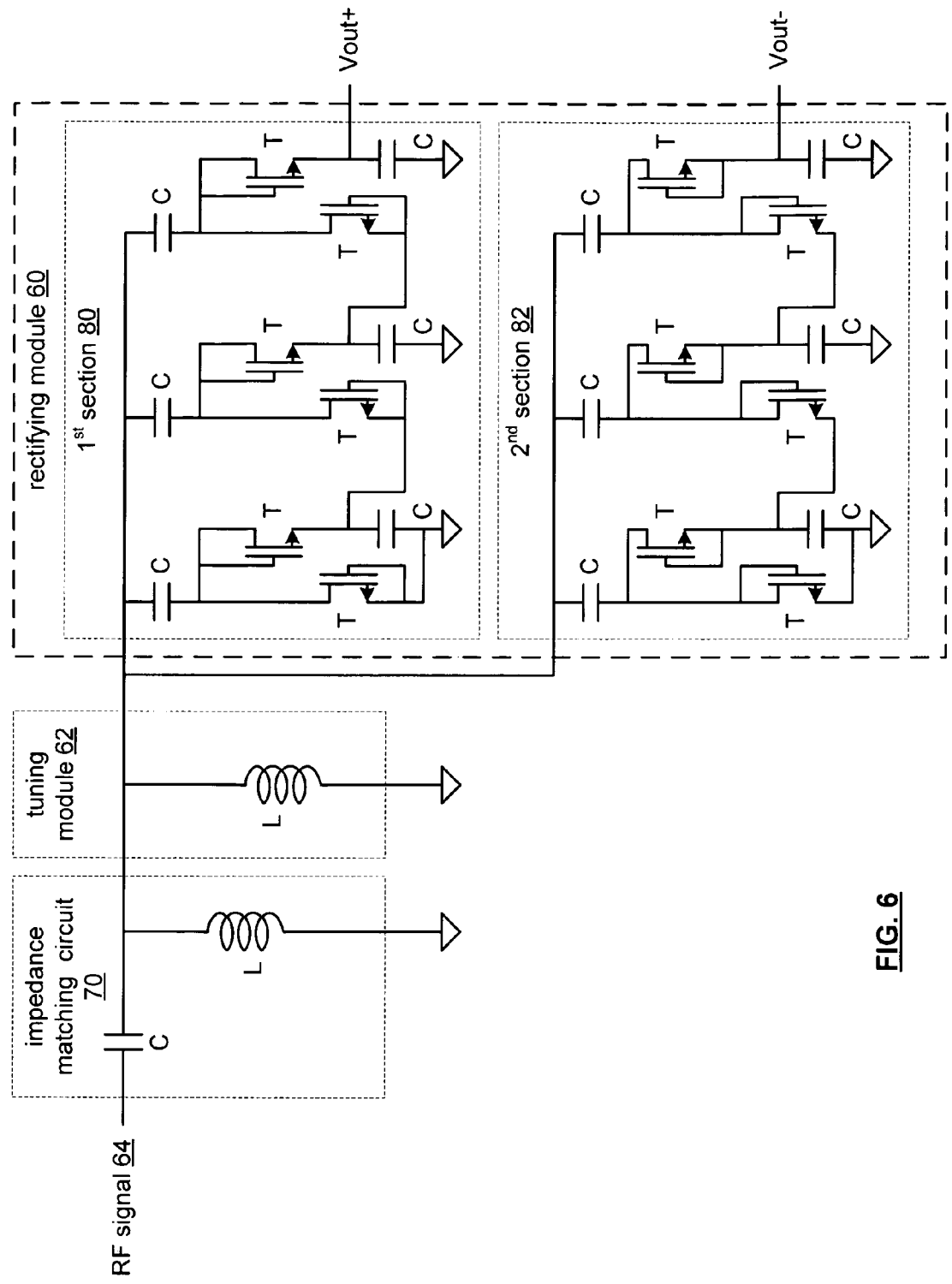
FIG. 6 is a schematic block diagram of still another embodiment of a power generating circuit in accordance with the present invention.

FIG. 6 is a schematic block diagram of still another embodiment of a power generating circuit 40 that includes the impedance matching circuit 70, the tuning module 62, and the rectifying module 60. The rectifying module 60 includes a first section 80 and a second section 82. In this embodiment, the first section 80 produces a positive output voltage (Vout+) and the second section 82 produces a negative output voltage (Vout−). As shown, the first and second sections 80 and 82 are charge pump rectifiers having reverse coupling of the transistors. As one of ordinary skill in the art will appreciate, other rectifier topologies may be used to produce a positive and negative output voltage.

Figure 7:
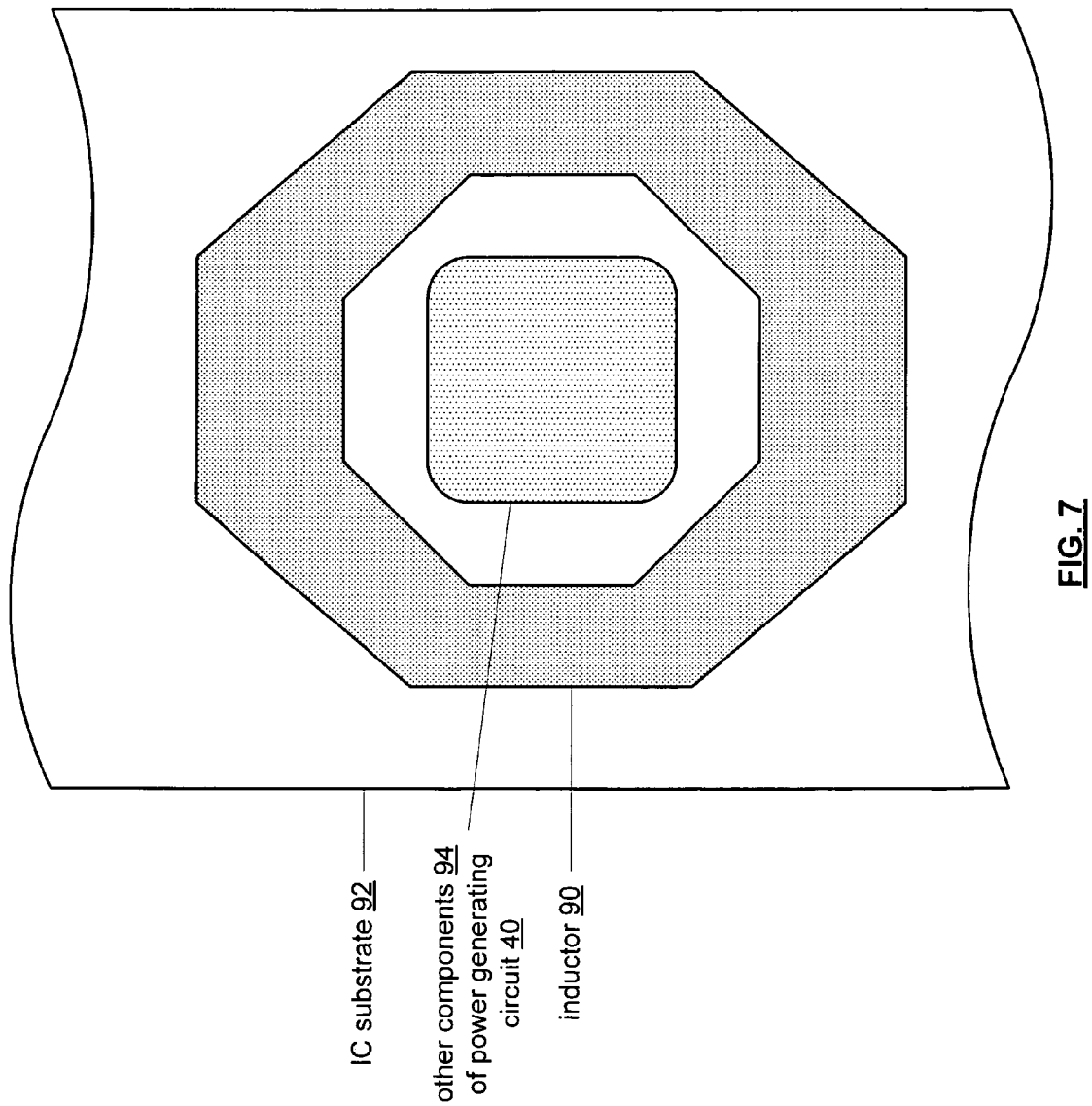
FIG. 7 is a diagram illustrating a layout of a power generating circuit in accordance with the present invention.

FIG. 7 is a diagram illustrating a layout of a power generating circuit 40 fabricated on an integrated circuit (IC) substrate 92. In this embodiment, the inductor 90 of the power generating circuit 40 includes one or more windings and an opening. The other components 94 (e.g., the capacitors and transistors) of the power generating circuit 40 are fabricated on the IC substrate 92 in the inductor opening.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments of a power generating circuit that may be used in an RFID tag. As one of ordinary skill in the art will appreciate, other embodiments may be derived from the teachings of the present invention without deviating from the scope of the claims.

What is claimed is:

1. A power generating circuit comprises:
   an antenna operably coupled to receive a radio frequency (RF) signal;
   a rectifying module operably coupled to convert the RF signal into a voltage, wherein the rectifying module includes a plurality of cells, wherein a first one of the cells converts the RF signal into a first voltage that is further increased by a remainder of the plurality of cells into the voltage; and
   a tuning module operably coupled to tune the rectifying module in accordance with the RF signal to obtain a desired frequency response of the power generating circuit, wherein a cell of the plurality of cells includes:
   a first capacitor having a first connection and a second connection, wherein the first connection is coupled to receive the RF signal;
   a first transistor having a control node, a source node, and a return node, wherein the control node and source node of the first transistor are coupled to the second connection of the first capacitor;
   a second transistor having a control node, a source node, and a return node, wherein the source node of the second transistor is coupled to the second connection of the first capacitor; and
   a second capacitor having a first connection and a second connection, wherein the second connection of the second capacitor is coupled to the control node and return node of the second transistor and the first connection of the second capacitor is coupled to the return node of the first transistor to produce an output of the cell.

2. The power generating circuit of claim 1 further comprises:
   impedance matching circuit operably coupled to the rectifying module and to the tuning module to provide a desired impedance of the power generating circuit.

3. The power generating circuit of claim 2, wherein the impedance matching circuit comprises at least one of:
   an inductor-capacitor filter having a resonant frequency based on the desired impedance; and
   a capacitor-inductor filter having a resonant frequency based on the desired impedance.

4. The power generating circuit of claim 2 comprises:
   the impedance matching circuit including a capacitor-inductance filter having a resonant frequency based on the desired impedance; and
   the tuning module including an inductance, wherein an inductor provides the inductance of the capacitor-inductance filter and the inductance of the tuning module.

5. The power generating circuit of claim 4 comprises:
   the capacitor-inductance filter and the inductance of the tuning module including at least one of a variable inductor and a variable capacitor.

6. The power generating circuit of claim 1, wherein the tuning module comprises at least one of:
   an inductor; and
   a capacitor, wherein the inductor has an inductance based on effective capacitance and effective resistance of the rectifying circuit and wherein the capacitor has a capacitance based on the effective capacitance and effective resistance of the rectifying circuit.

7. The power generating circuit of claim 6 further comprises:
   an integrated circuit substrate, wherein the rectifying module and tuning module are fabricated on the integrated circuit substrate and wherein the inductor functions as an antenna to receive the RF signal.

8. The power generating circuit of claim 6 comprises:
   the inductor fabricated on a surface of an integrated circuit substrate, wherein the inductor includes a winding having an open area, wherein the capacitor and at least one component of the rectifying module are fabricated on the surface within the open area.

9. The power generating circuit of claim 1, wherein the rectifying module comprises:
   a second plurality of plurality of cells, wherein the plurality of cells generates a positive leg of the voltage and the second plurality of cells generates a negative leg of the voltage.

10. A power generating circuit comprises:
    an adjust module operably coupled to adjust a radio frequency (RF) signal to produce an adjusted RF signal; and
    conversion module operably coupled to convert the adjusted RF signal into a voltage, wherein the adjust module has a frequency response combined with a frequency response of the conversion module to provide a desired frequency response of the power generating circuit and wherein the rectifying module includes a plurality of cells, wherein a first one of the cells converts the RF signal into a first voltage that is further increased by a remainder of the plurality of cells into the voltage, and wherein a cell of the plurality of cells includes:
- a first capacitor having a first connection and a second connection, wherein the first connection is coupled to receive the RF signal;
- a first transistor having a control node, a source node, and a return node, wherein the control node and source node of the first transistor are coupled to the second connection of the first capacitor;
- a second transistor having a control node, a source node, and a return node, wherein the source node of the second transistor is coupled to the second connection of the first capacitor; and
- a second capacitor having a first connection and a second connection, wherein the second connection of the second capacitor is coupled to the control node and return node of the second transistor and the first connection of the second capacitor is coupled to the return node of the first transistor to produce an output of the cell.

11. The power generating circuit of claim 10, wherein the adjust module further functions to provide:
a desired impedance of the power generating circuit.

12. The power generating circuit of claim 11, wherein the adjust module comprises:
- a capacitor-inductance filter having a resonant frequency to provide the desired impedance of the power generating circuit; and
- a tuning inductance to provide the desired frequency response, wherein an inductor provides the inductance of the capacitor-inductance filter and the tuning inductance.

13. The power generating circuit of claim 12 comprises:
the capacitor-inductance filter and the tuning inductance including at least one of a variable inductor and a variable capacitor.

14. The power generating circuit of claim 10, wherein the adjust module comprises at least one of:
- an inductor; and
- a capacitor, wherein the inductor has an inductance based on effective capacitance and effective resistance of the rectifying circuit and wherein the capacitor has a capacitance based on the effective capacitance and effective resistance of the rectifying circuit.

15. The power generating circuit of claim 14 further comprises:
an integrated circuit substrate, wherein the rectifying module and the adjust module are fabricated on the integrated circuit substrate and wherein the inductor functions as an antenna to receive the RF signal.

16. The power generating circuit of claim 14 comprises:
the inductor fabricated on a surface of an integrated circuit substrate, wherein the inductor includes a winding having an open area, wherein the capacitor and at least one component of the conversion module are fabricated on the surface within the open area.

17. The power generating circuit of claim 10, wherein the conversion module comprises:
a second plurality of plurality of cells, wherein the plurality of cells generates a positive leg of the voltage and the second plurality of cells generates a negative leg of the voltage.

* * * * *